(No Model.)

P. JABLOCHKOFF.
ELECTRIC BATTERY.

No. 273,739. Patented Mar. 13, 1883.

WITNESSES:

INVENTOR:
Paul Jablochkoff
By his Attorneys,

UNITED STATES PATENT OFFICE.

PAUL JABLOCHKOFF, OF PARIS, FRANCE.

ELECTRIC BATTERY.

SPECIFICATION forming part of Letters Patent No. 273,739, dated March 13, 1883.

Application filed September 14, 1882. (No model.) Patented in France June 27, 1882, and in England July 5, 1882, No. 3,172.

*To all whom it may concern:*

Be it known that I, PAUL JABLOCHKOFF, a resident of Paris, France, have invented certain new and useful Improvements in Electric Batteries, of which the following is a specification.

This invention is protected by a French patent dated June 27, 1882, and by British Patent No. 3,172, dated July 5, 1882.

It is a well-known fact that when a metal is exposed to oxidation an electric current is produced. Besides, certain metals—such as potassium, sodium, and other metals belonging to the same general group—oxidize in the open air.

Heretofore in constructing electric batteries or piles there have always been combined an oxidizing metal, a salt or exciting-acid, and another electrode consisting of an inert body. I have conceived the idea of availing myself of the property of oxidizing in the open air possessed by the metals referred to, in order to utilize them as positive elements or plates for the electric piles. With them I use neither salt nor acid, but the air itself performs the part of exciter by oxidizing the potassium, sodium, or other metal. In this manner I produce a pile without an exciting-liquid. In order to derive the greatest possible advantage from this oxidation of the potassium, sodium, or other metal, and at the same time insure the production of the electric current, I press a plate of the metal against a plate of carbon, separating the two plates by a sheet of paper or other thin porous hygrometrical sheet. The only agent which is permitted to act upon the metal to oxidize it is the air which permeates the carbon, which it does readily because of the great porosity of the carbon. The remainder of the surface of the sodium is protected by varnish or any other insulating-covering. My pile consequently embraces as a positive element a metal which the air suffices to oxidize, and as a negative element either porous carbon or any inert porous substance—such as spongy platina, doubled-up wire-cloth, &c.—the two elements being placed the one against the other, but being separated from each other by means of a sheet of paper, or otherwise kept slightly asunder. This principle can be carried into practice in a great variety of ways. As examples, I shall describe several of them, referring for the purpose to the annexed drawings, in describing which I shall assume that the positive element is the metal sodium, and the negative element is porous carbon.

Figure 1:
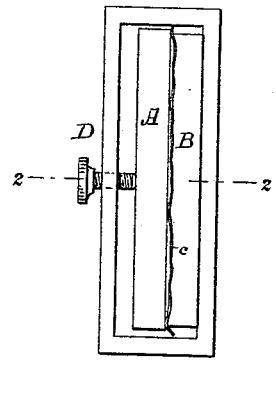
Figures 2, 3:
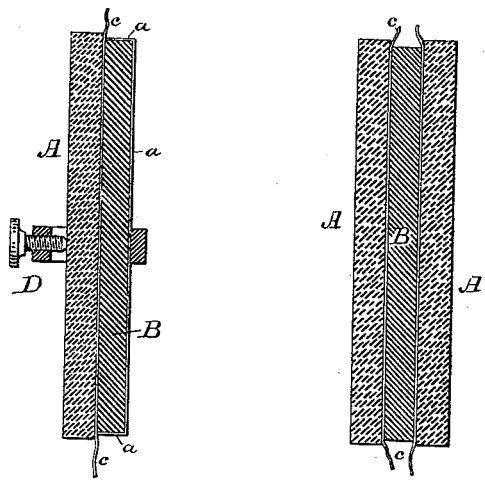
Figure 4:
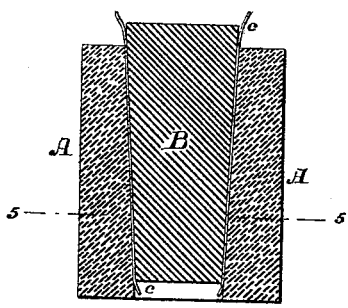
Figure 5:
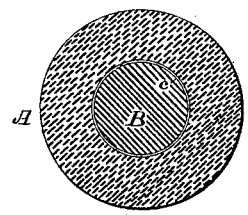

Figure 1 is an end view of one voltaic pair or couple made according to my invention. Fig. 2 is a longitudinal mid-section thereof. Fig. 3 is a view similar to Fig. 2, but showing a modified arrangement. Fig. 4 is a longitudinal mid-section of a modified form of pile, and Fig. 5 is a cross-section thereof.

In all the figures, A designates the carbon; B, the sodium, and c the intervening sheet of paper or other fabric.

In Figs. 1 and 2 the elements A and B are both plates, separated by the paper sheet c, and held together by a screw-clamp, D. The exposed surfaces of the sodium plate B are protected by a coating of varnish, *a a*, in order to prevent their useless oxidation.

In Fig. 3 two carbon plates are employed, with the sodium plate embraced between them. In this manner a greater quantity of electricity is generated.

Figs. 4 and 5 show a voltaic couple consisting of a hollow cylinder, A, of carbon, into which a stick or plug, B, of sodium, is thrust, the latter being first wrapped in paper or cloth *c*. In any case the action of my pile is that the sodium oxidizes and is transformed into caustic soda, attracting the moisture contained in the air, and in this manner facilitating oxidation still further. The dissolved caustic soda penetrates into the pores of the carbon and passes out at the outside. Through the action of the nitrogen of the air the greater portion of the caustic soda is transformed into nitrate of soda, as the air passes through the pores of the carbon.

In order to facilitate the operating of this pile, I plunge the latter, when ready, into some liquid—alcohol by preference—and as soon as it is removed therefrom its action commences. In order to preserve the piles when not in use, they are kept in a bath of mineral oil, or a closed vessel containing hydrogen or common lighting-gas. When kept in oil they are to be washed with alcohol before using them.

I have also found that it is advisable to plunge the carbons used for manufacturing these piles into nitric acid, for by doing so the electro-motive force is increased and the commencement of action is facilitated.

It is a peculiarity of this pile that after it has been used for a time as a generating-battery it becomes capable of use as a secondary battery—that is to say, on submitting it to the action of a strong current, the reverse of the one it gives, the sodium, potassium, or other metal employed is reconstituted, and in this manner it can be made to serve a very long time. As before stated, the moisture of the air facilitates the action of the pile. If, therefore, it were intended to operate in too dry an atmosphere, it would be advisable to produce the requisite moisture artificially. This result may be obtained in various ways. It may suffice to sprinkle the pile or dip it from time to time into a liquid. A good method is to lengthen the sheets of paper or the strips of cloth c wrapped around the sodium plate, and let their lower ends dip into water or alcohol, when the liquid will rise by capillary attraction, and thus continually moisten the portions in contact with the sodium; or the entire pile may be kept wrapped in a cloth which is kept moistened.

In order to increase the surfaces and therewith the strength of the pile, I have found it of advantage to flute the carbon plates or to use instead of the latter a number of small sticks of carbon.

My new pile is very simple to make, and, above all, it is light and portable. It does not generate obnoxious gases, while at the same time it is kept in operation with extreme ease. The electro-motive force of these piles is quite considerable, exceeding in a notable manner that possessed by piles now in use. They are applicable to all the uses to which piles or batteries are now put.

My first experiments have convinced me that even supposing the present price of sodium should experience no abatement, these piles are a great deal less expensive than those made of zinc or copper, by reason of the slow waste of the sodium, causing the expenditure involved to be trifling.

I claim as my invention—

1. A pile or battery the positive element of which consists of sodium, potassium, or other metal or substance which rapidly oxidizes in the open air, and the negative element of which consists of an inert material of porous substance readily permeable by the air, the two elements being combined and arranged to operate substantially as set forth, whereby the pile may be made to operate without an exciting-liquid.

2. A pile or battery consisting of a positive element of some material which rapidly oxidizes on exposure to the air, and a negative element of an inert material of porous substance readily permeable by the air, the two elements being arranged in juxtaposition with an intervening layer of thin porous non-conducting fabric, substantially as set forth.

3. A pile or battery consisting of a plate of sodium or similar metal as the positive element, and a plate of porous carbon or other similar porous substance as the negative element, the two placed in juxtaposition with an intervening layer of porous insulating substance, and with the exposed surface of the positive element protected by an impervious coating, substantially as set forth.

In witness whereof I have hereunto signed my name in the presence of two subscribing witnesses.

PAUL JABLOCHKOFF.

Witnesses:
G. CHAPNIS,
J. ARMENGAUD, Jeune.